United States Patent [19]
Kirkham

[11] 3,856,564
[45] Dec. 24, 1974

[54] PAPER COATED WITH CLAY AND ASBESTOS

[75] Inventor: William Brian Kirkham, Montreal, Quebec, Canada

[73] Assignee: Domtar Limited, Montreal, Canada

[22] Filed: Aug. 7, 1973

[21] Appl. No.: 386,391

Related U.S. Application Data

[63] Continuation-in-part of Ser. No. 222,399, Jan. 31, 1972, abandoned.

[52] U.S. Cl. ............ 117/155 UA, 106/214, 117/156
[51] Int. Cl. ................................................. D21h 1/28
[58] Field of Search ............. 117/152, 155 UA, 156; 106/214; 162/153, 155, 181 D

[56] References Cited
UNITED STATES PATENTS

| | | | |
|---|---|---|---|
| 2,460,734 | 2/1949 | Callinan | 162/153 |
| 2,493,604 | 1/1950 | Walters | 162/153 X |
| 3,014,835 | 12/1961 | Feigley et al. | 162/181 X |
| 3,062,701 | 11/1962 | Novak | 162/155 X |
| 3,096,200 | 7/1963 | Quinn | 162/153 X |
| 3,102,063 | 8/1963 | Ray | 162/155 |
| 3,441,474 | 4/1969 | Hutchins | 162/155 |
| 3,692,509 | 9/1972 | Breiner | 162/153 X |

FOREIGN PATENTS OR APPLICATIONS

| | | | |
|---|---|---|---|
| 570,895 | 2/1959 | Canada | 117/152 |

*Primary Examiner*—Michael R. Lusignan
*Attorney, Agent, or Firm*—Cecil A. Rowley

[57] ABSTRACT

A coated paper utilizing a clay coating containing asbestos in the amount of 0.1 to 10 percent based on the weight of clay.

3 Claims, No Drawings

PAPER COATED WITH CLAY AND ASBESTOS

This application is a continuation-in-part of U.S. Pat. application Ser. No. 222,399 filed Jan. 31, 1972, now abandoned.

FIELD OF THE INVENTION

The present invention relates to a paper coating, more specifically, the present invention relates to a clay coating containing asbestos fibres.

DESCRIPTION OF THE PRIOR ART

The use of clay as a coating on paper is very well known and is used for a variety of purposes by most paper makers.

In the manufacture of light-weight papers, the opacity is critical and thus any economical means of improving the opacity should find immediate commercial acceptance.

It has previously been known to add asbestos at the wet end of a paper machine to improve the clay retention on the wire. It is not quite clear what the mechanism is whereby the retention of clay is improved. In Pulp and Paper, Jan. 10, 1966, and Paper Trade Journal, Feb. 14, 1966, there are articles indicating electron microscope studies have shown that small asbestos fibres have the ability to disperse clay platelets as well as hold them to the fibre surface. This may be the phenomenon that occurs when asbestos is added at the wet end. In any event, the addition of asbestos at the wet end of the machine does not materially increase the opacity of the resultant sheet much beyond that which would be obtained if clay alone were used.

SUMMARY OF THE INVENTION

It is an object of the present invention to provide an improved coating which will increase the opacity of the coated web.

Broadly, the present invention relates to a coating composed of clay and asbestos, and to a paper web coated thereby.

Further features, objects and advantages will be evident from the following detailed description of a preferred embodiment of the present invention.

DESCRIPTION OF THE PREFERRED EMBODIMENTS

It has been found that the addition of small amounts of asbestos powder or fibres to a clay coating composition materially increases the opacity of the resultant coated sheet, even relative to a control sheet coated with the same composition less than asbestos. A small increase in brightness is also noted. It is believed that this increase in brightness is probably due to the ability of the asbestos fibre to disperse the clay in the coating and have the clay more evenly distributed on the surface of the paper web.

It has been found that the asbestos should be of a small size such as powdered asbestos fibre or the like, the importance being that the asbestos be able to pass through conventional screens as used for recirculation of coating on a conventional coating machine.

The asbestos may be added in any suitable manner, for example, by pre-slurrying the asbestos in water, by slurrying the asbestos directly with the clay slip, or by adding asbestos to the final colour. Preferably, dispersing agents compatible with the materials of the coating will be used to facilitate the slurrying.

The following are some specific examples of coatings prepared and tested, the coatings having varying ratios of clay to asbestos.

Table I illustrates the change in coated publication grade paper characteristics when the total amount of clay and binder remain constant, and the amount of asbestos is varied.

In Table I the Coat Weight is the total weight of coating applied to both surfaces of the sheet. The difference in coat weight to each side is no greater than 1 lb/3,000 sq.ft.

It can be seen from Table I, when 0 parts asbestos are used the TAPPI Brightness is 66.9 to 67.8, whereas in the remaining cases the brightness appears to be improved almost a full point on average.

It will be noted that the opacity also increases at least a full point thereby showing significant increase in opacity with minor additions of asbestos.

Furthermore, it will be noted that the densometer reading, with minor additions of asbestos, is much lower thereby indicating a much more porous sheet which would be advantageous, for example, in vacuum packaging.

TABLE I

ASBESTOS COATINGS

| | | | | |
|---|---|---|---|---|
| Parts Clay (by weight) | 100 | 100 | 100 | 100 |
| Parts (starch) Binder (by weight) (sold under Trade Name CLARO 5591) | 15.4 | 15.4 | 15.4 | 15.4 |
| Parts Asbestos (by weight) | 0 | 1 | 2 | 3 |
| Coated Weight (lb/3300 sq.ft.) | 41.44 | 41.53 | 41.09 | 42.69 |
| Coat Weight (lb/3300 sq.ft.) | 11.68 | 11.60 | 11.16 | 12.76 |
| Densometer (sec/100 cc.)* | 76.3 | 39.7 | 39.6 | 62.6 |
| TAPPI Brightness (%)** | 66.9/ 67.8 | 67.8/ 68.8 | 67.5/ 69.1 | 67.6/ 68.7 |
| Elrepho Opacity*** | 92 | 93 | 93.1 | 93.2 |
| K & N**** | 64/63 | 56/55 | 57/57 | 55/55 |

*TAPPI Test T 460 os-68
**TAPPI Test T 452 m-58
***TAPPI No. T 425 m-60
****TAPPI Test RC-19, the reflectance of the ink spot having been measured with a Photovolt with a tri-stimulus green filter.

In Table II a comparison has been made between the control sample with 0 parts asbestos and the addition of 9 parts asbestos to 100 parts clay, and 9 parts asbestos to 91 parts clay, the latter showing a total amount of pigment equal to that of the control sheet.

TABLE II

| | | | |
|---|---|---|---|
| Parts Pigment (by weight) | 100 | 109 | 100 |
| Parts (starch) Binder (by weight) (sold under TRade Name CLARO 5591) | 15.4 | 15.4 | 15.4 |
| Parts Clay (by weight) | 100 | 100 | 91 |
| Parts Asbestos (by weight) | 0 | 9 | 9 |
| Coated Weight (lb/3300 sq.ft.) | 39.3 | 39.9 | 41.0 |
| Coat Weight (lb/3300 sq.ft.) | 10.3 | 10.9 | 11.0 |
| Densometer (sec/100 cc.) | 90 | 104 | 110 |
| TAPPI Brightness (%) | 66.4/ 67.7 | 67.3/ 68.5 | 68.5 69.9 |
| Opacity Elrepho | 91.6 | 92.7 | 93.9 |
| K & N | 74/70 | 69/67 | 66/62 |

It will again be noted that there is an increase in both brightness and opacity when the asbestos is added.

It has been found that the use of below about 0.1 percent asbestos based on the clay produces very little, if any, improvement in brightness and opacity of the coated sheet. Coatings containing up to about 10 percent asbestos based on the clay have been tried and found operable, however, at these higher asbestos concentrations dispersion of the asbestos becomes a problem. Generally, very high shear mixers are necessary to disperse the asbestos and the amount of shear applied can vary the characteristics of the resultant coating. Generally, it is preferred to use between about 0.5 and 5 percent asbestos based on the clay and preferably the amount of asbestos will be about 1 to 3 percent based on the clay content of the coating.

It is believed that minor additions of other pigments such as titanium dioxide and calcium carbonate do not materially detract from the beneficial effect of the asbestos on the clay dispersion.

The above examples have all used starches as the binder but it is apparent that any suitable binder may be used and that since the remainder of the composition is essentially inert, substantially any conventional binder will be operative. For example, latexes such as acrylic or styrene butadiene; mixtures of starch and latex; caseins or proteins may be used as binder with the quantities of the binder naturally being adjusted to obtain the desired results. Generally the quantity of binder will be in the range of about 10 to 20 percent based on the weight of the clay. Normally when starch is used as the binder the amount of binder will be in the range of about 14 to 18 percent based on the weight of the clay and when latex, protein or casein is used as the binder, the amount of binder will be in the range of about 10 to 15 percent.

Thus, basically, the coating of the present invention will consist essentially of clay and asbestos together with sufficient binder to give the coating the required strength. Minor portions of conventional coating additives will be included depending on the application and ultimate use of the coated paper.

Having described the invention, modifications will be evident to those skilled in the art without departing from the spirit of the invention as defined in the appended claims:

1. A coated paper comprising a substrate of paper and a coating consisting essentially of clay and asbestos and a binder, said asbestos being present in the amount of 0.1 to 10 percent based on the weight of the clay said binder being present in the amount of 10 percent – 20 percent based on the weight of said clay, and said coating being uniformly distributed over at least one surface of the substrate.

2. A coated web as defined in claim 1 wherein said asbestos is present in the amount of 0.5 to 5 percent based on the weight of clay.

3. A coated web as defined in claim 1 wherein said asbestos is present in the amount of 1 to 3 percent based on the weight of clay.

* * * * *